(12) United States Patent
Spykerman et al.

(10) Patent No.: US 7,661,505 B2
(45) Date of Patent: Feb. 16, 2010

(54) VEHICLE CONSOLE

(75) Inventors: David J. Spykerman, Chandler, AZ (US); Craig Flowerday, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 378 days.

(21) Appl. No.: 10/582,065

(22) PCT Filed: Dec. 10, 2004

(86) PCT No.: PCT/US2004/041326

§ 371 (c)(1),
(2), (4) Date: Jun. 8, 2006

(87) PCT Pub. No.: WO2005/058630

PCT Pub. Date: Jun. 30, 2005

(65) Prior Publication Data

US 2007/0176448 A1    Aug. 2, 2007

Related U.S. Application Data

(60) Provisional application No. 60/528,396, filed on Dec. 10, 2003.

(51) Int. Cl.
*B60K 23/00* (2006.01)
(52) U.S. Cl. .................. 180/326; 180/334; 180/336
(58) Field of Classification Search .............. 180/334, 180/326, 315
See application file for complete search history.

(56) References Cited

U.S. PATENT DOCUMENTS

| 5,161,422 | A | * | 11/1992 | Suman et al. | ................. 74/335 |
| 5,617,929 | A | * | 4/1997 | Richardson et al. | ......... 180/326 |
| 6,065,560 | A | | 5/2000 | Palmeri et al. | |
| 6,536,825 | B2 | * | 3/2003 | McAndrew et al. | ...... 296/37.13 |
| 6,948,582 | B2 | * | 9/2005 | Shiomi et al. | ............... 180/315 |
| 2002/0139602 | A1 | * | 10/2002 | Okanda | ..................... 180/326 |

FOREIGN PATENT DOCUMENTS

| DE | 42 36 851 A1 | 5/1994 |
| DE | 297 24 363 U1 | 2/2001 |
| DE | 101 22 454 A1 | 11/2001 |
| EP | 1 028 021 A2 | 8/2000 |

OTHER PUBLICATIONS

International Search Report for. PCT/US2004/041326, mailing date Feb. 23, 2005, 3 pages.

* cited by examiner

*Primary Examiner*—Paul N Dickson
*Assistant Examiner*—Nicole Verley
(74) *Attorney, Agent, or Firm*—Foley & Lardner LLP (57) ABSTRACT

A console system (10) configured to support a control module (44) (e.g., a user interface, etc.) operatively coupled to a vehicle system (e.g., a vehicle transmission, etc.), and which can be selectively and conveniently repositioned and/or reconfigured within a vehicle in a variety of positions is disclosed. The control module (44) is operatively coupled to the vehicle system without the use of conventional mechanical linkage. By providing flexibility in the positioning of the control module (44), the console system can be configured and/or reconfigured to meet the desires and/or needs of a variety of users.

16 Claims, 13 Drawing Sheets

VEHICLE CONSOLE

CROSS-REFERENCE TO RELATED PATENT APPLICATIONS

The present Application claims the benefit of priority to U.S. Provisional Patent Application No. 60/528,396, titled "BY-WIRE ENABLED CONSOLE," filed on Dec. 10, 2003 and International Application PCT/US2004/041326 titled "VEHICLE CONSOLE," filed on Oct. 12, 2004, the full disclosures of which are incorporated herein by reference in their entirety.

BACKGROUND

The present invention relates generally to vehicle console systems configured to support a user interface operatively coupled to a vehicle system (e.g., a vehicle transmission, etc.). More particularly, the present invention relates console systems configured to support a user interface operatively coupled to a vehicle system without using conventional mechanical linkage.

Storage receptacle systems, such as console systems, for use with vehicles are generally known. The popularity of console systems in vehicles has continued to increase with the popularity of SUVs, vans, light trucks, and the like, as well as with cars having split front seats. Console systems are known to provide enhanced functionality, such as storage bins for a variety of articles or devices (e.g., CDs, DVDs, mobile telephones, maps, sun glasses, change bins, etc.), as well as additional features such as power ports, electronics (e.g. televisions, stereos, navigational systems, etc.), cup holders, trays, and the like. It is further known to incorporate the transmission controls of a vehicle with a console system, as well as additional vehicle controls such as controls for lights, audio, video, HVAC, mirrors, fuse panels, sunroofs, and the like.

The incorporation of a vehicle's transmission controls in a console system may provide a more sophisticated, sportier, and/or ergonomically improved design for a user. Transmission controls generally include a base portion and a gear shift lever device for allowing a user to select an appropriate gear.

The gear shift lever device may be configured to control a traditional automatic transmission which allows selection of different gears as well as the usual park, reverse, neutral and standard automatically shifted drive position (e.g., PRNDL, etc.) or a manual transmission such as a conventional H-floor shift pattern. Conventionally, a gear shift lever device for a vehicle is coupled to the transmission of the vehicle by a large and complicated mechanical inking mechanism. The mechanical linkage extends from inside the vehicle to the transmission.

The large mechanical linkage conventionally existing between the gear shift control lever device and the transmission undesirably limits the possible configurations and usability of a console system to which transmission controls are coupled to or contained within. Console systems that support conventional transmission controls must be fixedly mounted within a vehicle due to the required mechanical linkage. For example, mechanical linkage extending from a console to the transmission would inhibit the fore and aft displacement of the console. In addition, the large size of the mechanical linkage requires a console to be configured around the linkage. Advantageous features possible for a console such as additional storage compartments, streamlining the console by covering infrequently used components, displacement of the console, etc. may not be possible when conventional transmission controls are included in the console configuration.

Therefore, it would be advantageous to provide a console configuration having a transmission control device, wherein the transmission control device may be moveably coupled to the console to expose and/or cover additional components included in the console. It would further be advantageous to provide a console configuration having a transmission control device wherein the console is movably positionable throughout the vehicle. It would further be advantageous to provide console having transmission controls that is coupled to one or more of the movably positionable forward seats of a vehicle. It would further be advantageous to provide a console having transmission controls that is coupled to one of the forward seats of a vehicle and may be configured to move to allow access between the front and rear portions of a vehicle. Accordingly, it would be advantageous to provide a console having these or other advantageous features.

SUMMARY

According to one embodiment, a console for use in a vehicle includes a base coupled to the vehicle. The base supports at least one article and control module operatively coupled to a vehicle system. The control module is movably coupled to the base and adapted for moving between a first position and a second position. In the first position, the at least one article is exposed and accessible to a user. In the second position, the control module is selectively positioned to at least partially conceal the at least one article. According to a preferred embodiment, the vehicle system is a transmission. The control module or transmission control assembly in such an embodiment is operatively coupled to the transmission without the use of conventionally used mechanical linkage. For example, the transmission control assembly can be electrically coupled to the transmission using "shift by-wire" technology. Shift by-wire technology replaces the mechanical linkage existing between a user interface and the transmission with an electronic system (e.g., circuitry, sensors, etc.) which produce an electric output signal corresponding to the position of the user interface. The electric output signal is detected by an actuator (such as a solenoid or a motor) which is in turn driven according to an output signal to drive a member for shifting the transmission.

According to another embodiment, a console for use in a vehicle includes a base movably coupled to the vehicle. The base supports a control module having a user interface and operatively coupled to a vehicle system. The base may be moved within the vehicle without interfering with the functionality of the control module.

According to another embodiment, a seat-mounted console system for use in a vehicle includes a base configured to be coupled to a movable vehicle seat. The base supports a control module that is operatively coupled to a vehicle system. The vehicle seat may be moved within the vehicle without interfering with the functionality of the control module.

According to another embodiment, an instrument panel-mounted console includes a base movably coupled to an instrument panel and configured to support a control module that is operatively coupled to a vehicle system. The base member is selectively positionable by a user to provide optimal placement of the control module.

According to the various other suitable embodiments, a console system includes various features and/or combinations of features shown and described in this disclosure. Other ways in which the objects and features of the disclosed embodiments are accomplished will be described in the following specification or will become apparent to those skilled in the art after they have read this specification.

BRIEF DESCRIPTION OF THE DRAWINGS

In the various drawings, like reference numerals are used to indicate like components.

DETAILED DESCRIPTION

A console system configured to support a user interface (e.g., control module, etc.) operatively coupled to a vehicle system (e.g., a vehicle transmission, brakes, accelerator, etc.), and which can be selectively and conveniently repositioned and/or reconfigured within a vehicle in a variety of positions is disclosed. To allow for the selective repositioning and/or reconfiguring of the console, the control module is operatively coupled to the vehicle system without the use of conventional mechanical linkage. According to a preferred embodiment, the console system supports a control module electrically coupled to a vehicle transmission (e.g., electric shift, shift by-wire, etc.).

Referring to FIGS. 1 through 15, vehicle console systems and components thereof are shown according to exemplary embodiments. In general, the disclosed embodiments provide systems wherein the control module, shown as a vehicle transmission control, can be selectively positioned and/or repositioned about the vehicle. By providing flexibility in the positioning of the vehicle's transmission controls, the console systems can be configured and/or reconfigured to meet the desires and/or needs of a variety of users.

Figure 1:
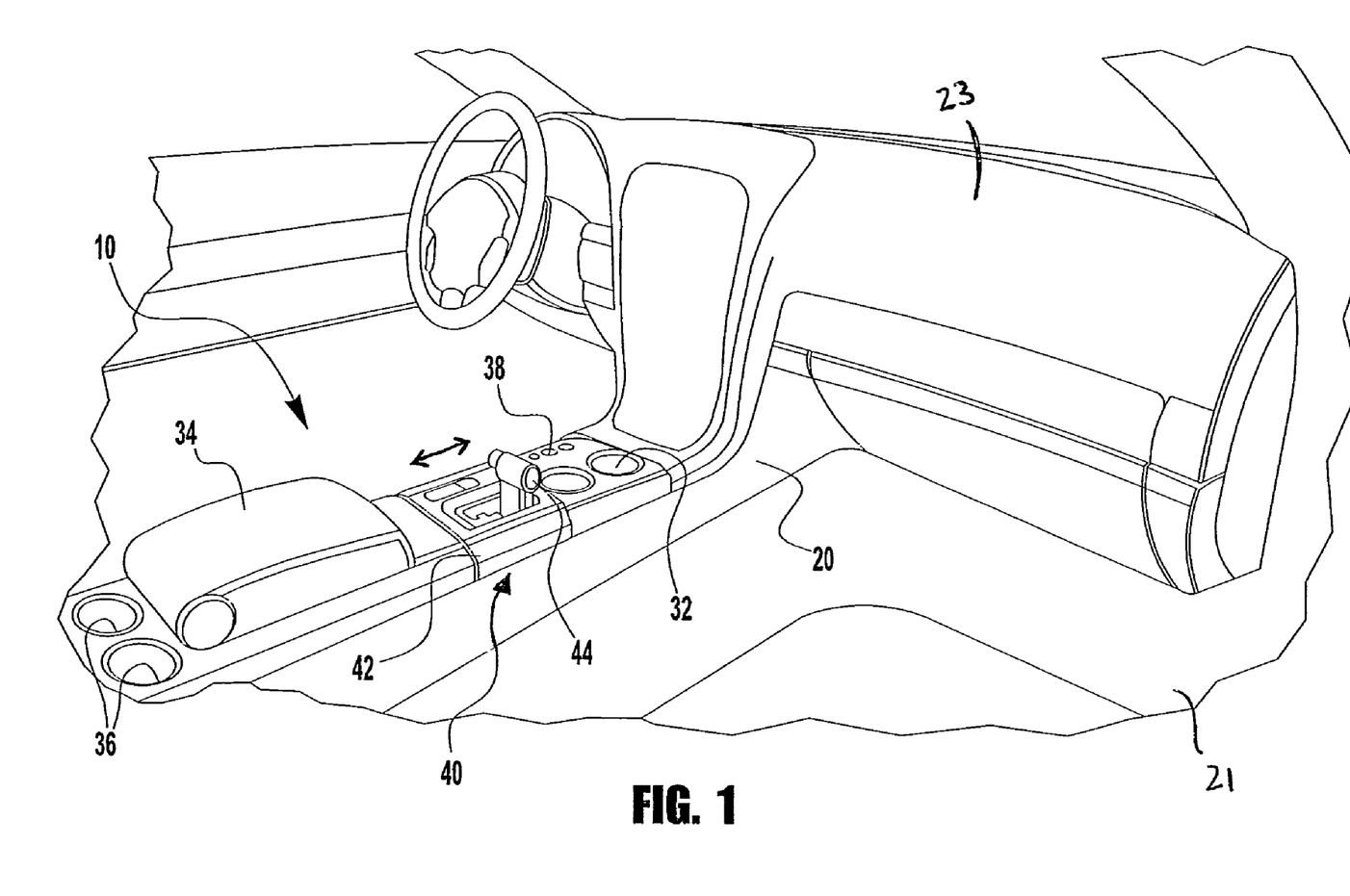
FIG. 1 is a perspective view of a vehicle console system according to one exemplary embodiment, showing the console system in a first position.

FIG. 1 shows a console system 10 for use with a vehicle according to one exemplary embodiment. Console system 10 can provide a structure having multiple uses and/or functions. Console system 10 is shown installed in and used in conjunction with the interior of an automobile. Console system 10 can be used with any of a variety of motor vehicle applications (e.g., minivan, sport utility vehicle, truck, recreation vehicle, etc.) or other vehicle applications such as farm and construction equipment.

Console system 10 typically comprises a body (e.g., platform, support, housing, frame, etc.) shown as base member 20, a plurality of components (e.g., cup holders, storage receptacles, compartments, containers, power ports, devices, fuse panels, consumer objects, vehicle accessories, etc.) shown generally as articles 30, and a control module shown as a transmission control assembly (e.g., gear shift lever device, PRNDL, H-shift pattern device, etc.) or shifter assembly 40. Base member 20, articles 30, and shifter assembly 40 cooperate to provide a moveable and/or selectively configurable or reconfigurable console system for use in the vehicle.

Base member 20 is shown coupled to both a floor 21 and an instrument panel 23 of the vehicle. According to the various alternative embodiments, base member 20 can be coupled to a variety of vehicle structures including, but not limited to, floors, interior side panels, overhead systems, seating systems, instrument panels (e.g., dashboards, etc.), door panels, and/or track systems. Base member 20 is shown laterally (i.e., side to side) centered within the vehicle and is generally positioned between the two front seats (e.g., a driver and passenger seat, etc.) of a vehicle to serve as a divider (e.g., boundary, separator, border, etc.) between the seats (not shown).

According to an alternative embodiment, base member 20 can be substantially centered within the vehicle without dividing the front seats. In such an embodiment, base member 20 can be positioned (e.g., nested, etc.) substantially under instrument panel 23 of the vehicle. Such an embodiment may provided greater flexibility in the type of vehicle seat used. For example, a bench seat and/or a 60/40 split seat can be used as well as bucket seats.

Base member 20 is shown fixedly coupled within the vehicle. Base member 20 may be coupled through the use of a mechanical fastener (e.g., clips, screws, rivets, bolts, snaps, etc.), a welding process (e.g., resistance spot welding, gas metal arc welding, laser welding, ultrasonic welding, etc.), an adhesive, or any combination of these or other suitable method or technique.

Alternatively, base member 20 can be movably coupled relative to the vehicle. For example, base member may be coupled to a track system providing for the slidable movement of console system 10. A suitable track system may generally comprises a guide (e.g. track, channel, slot, etc.) and a follower configuration that functions similarly to mechanisms used to provide the slidable movement of vehicle seats. Providing for the slidable movement of console system 10 may advantageously allow occupants in a rear portion of a vehicle to enjoy the functionality of console system 10. Further, coupling base member 20 to a track system may allow console system 10 to be selectively positioned so that occupants may acquire access to areas throughout the vehicle otherwise limited by console system 10. Base member 20 may be coupled to a track system providing slidable movement in the fore and aft direction of the vehicle and/or in a lateral direction.

Figure 2:
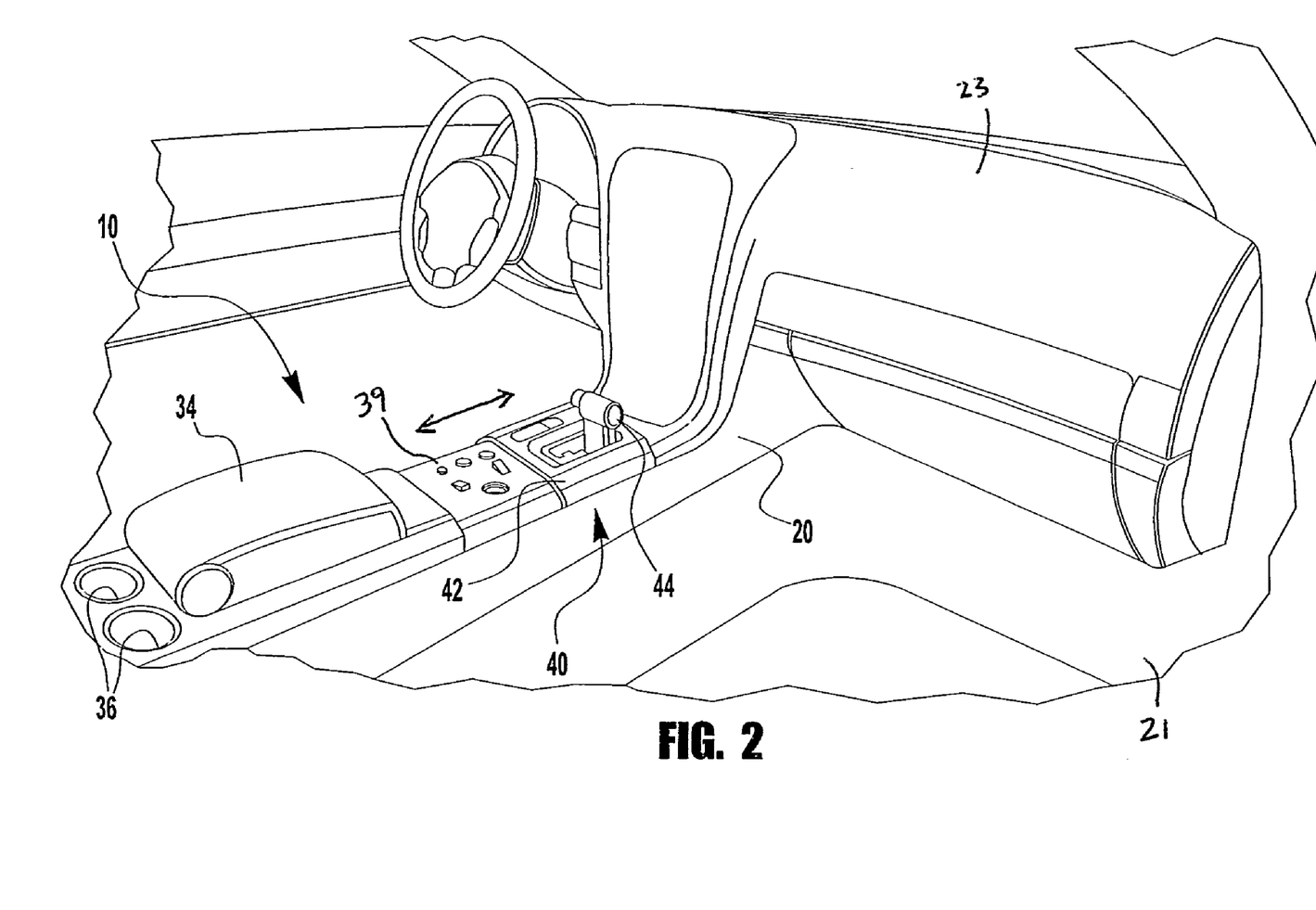
FIG. 2 is a perspective view of the vehicle console system shown in FIG. 1, with the console system moved to a second position.
Figure 3:
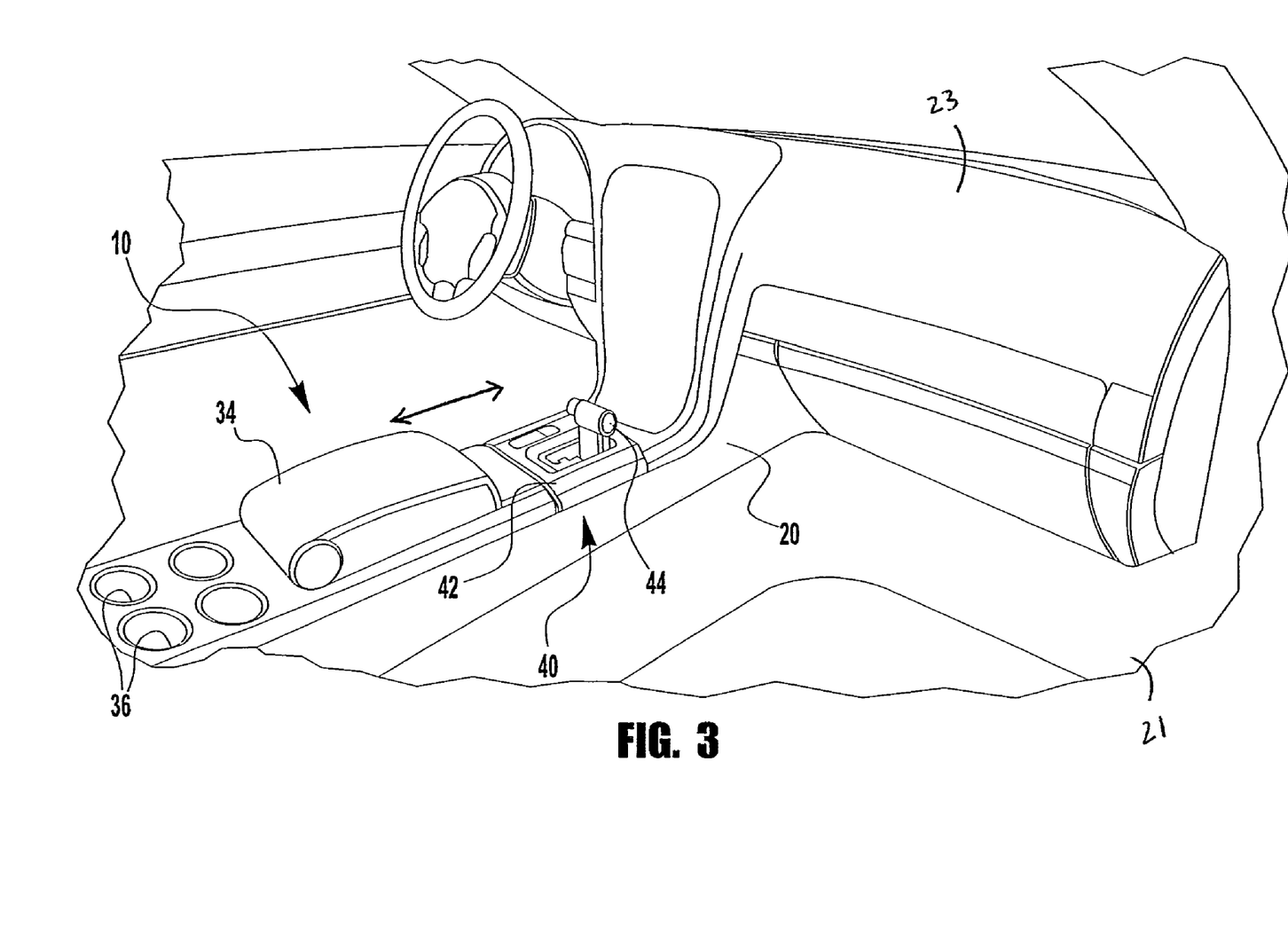
FIG. 3 is a perspective view of the vehicle console system shown in FIG. 1, with the console system moved to a third position.

Referring to FIGS. 1 through 3, a plurality of articles 30 are incorporated or coupled to base member 20. Base member 20 is shown to include articles 30 in the form of beverage receptacles 32, vehicle controls 38, vehicle controls 39, an armrest 34, and beverage receptacles 36. According to other suitable embodiments, base member 20 may include any of a variety of articles 30 including, but not limited to, fuse access panels, power ports, electrical and electronic devices, containers, storage compartments, or consumer articles.

Shifter assembly 40 functions as an interface between a user and the vehicle's transmission (not shown). By actuating the shifter assembly 40, a user can selectively control the gear selection of the transmission. Shifter assembly 40 generally includes a support member 42 and a user interface, shown as gear shift lever 44. Support member 42 supports gear shift lever 44 within the vehicle, while gear shift lever 44 is the member configured to be actuated by the user. Gear shift lever 44 is advantageously coupled to the transmission without using conventional mechanical linkage.

According to one exemplary embodiment, gear shift lever 44 is electrically coupled to the transmission via "shift by-wire" technology. Shift by-wire technology replaces the conventional mechanical linkage existing between gear shift lever 44 and the transmission with an electrical system (e.g., electronics, circuitry, sensors, etc.) which provides an electric output signal corresponding the desired gear selection for the transmission (e.g., corresponding to the position of gear shift lever 44, etc.). The electric output signal is detected by an actuator such as a solenoid or a motor which is in turn driven in according to the output signal to drive a member for shifting the transmission.

According to various alternative embodiments, gear shift lever 44 may be replaced with any other suitable user interface. Examples of suitable user interface's include, but are not limited to, touch screens, voice recognition systems, push buttons, dials (shown in FIGS. 14 and 15), or knobs.

Support member 42 is shown defining the shift pattern for gear shift lever 44. According to one exemplary embodiment, the shift pattern defined by support member 42 is configured as a traditional automatic transmission which allows the selection of different gears as well as the usual park, reverse, neutral and standard automatically shifted drive position (e.g., PRNDL, etc.). According to other suitable embodiments, the shift pattern defined by support member 42 may be configured as an automatic transmission providing a user with the feel of a conventional H-floor shift pattern (i.e., just like a manual transmission), a manual transmission (i.e., wherein the user must shift the transmission while in drive, or a combination of both an automatic transmission and a manual transmission.

By eliminating the use of the conventional mechanical linkage between a user interface and the transmission, increased flexibility in the configuration and/or reconfiguration of console system 10 is advantageously achieved. For example, the utilization of shift by-wire technology enables shifter assembly 40 to be moveably coupled relative to base member 20 and/or allows shifter assembly 40 to be movably-coupled relative to the vehicle.

Providing a movable shifter assembly 40 may be used to enhance functionality of console system 10, optimize the positioning of shifter assembly 40, and/or improve vehicle aesthetics within a cockpit area. Functionality of console system 10 may be enhanced by allowing console 10 to be selectively reconfigured. For example, users of the same vehicle may not agree on the configuration of a console (e.g. one operator may prefer to have a storage receptacle as part of the console while another operator may not). A movably coupled shifter assembly 40 allows the layout of the console to be reconfigured to meet the desires and/or needs of different operators.

Further, the movable coupling of shifter assembly 40 provides for optimal positioning of shifter assembly 40 regardless of the dimensions of the user. For example, a relatively tall person is likely to position (e.g., slide, etc.) the driver seat towards the rear of the vehicle while a relatively short person is likely to position the driver seat towards the front of the vehicle. By movably coupling shifter assembly 40 to a console system 10, the operator may position shifter assembly 40 (particularly gear shift lever 44) to correspond to the positioning of the driver seat.

Providing for a movable shifter assembly 40 (particularly support member 42) may also allow for a "cleaner" or aesthetically pleasing cockpit area. For example, shifter assembly 40 may be coupled to base member 20 and positioned over articles 30 that are incorporated into base member 20. By movably coupling shifter assembly 40 to base member 20, articles 30 may be covered (e.g. hidden, unexposed, unseen, etc.) by shifter assembly 40 until access to articles 30 is desired by the user (e.g. infrequently used storage areas, increased security, anti-theft feature, etc.). The user may desire physical access (e.g. storage, controls, etc.) and/or visible access (e.g. gauges, info-screens, navigational systems, etc.) to articles 30.

According to one exemplary embodiment, shifter assembly 40 is slidably coupled to base member 20. Shifter assembly 40 is shown adapted for linearly sliding in the fore and aft direction of the vehicle between a first position (shown in FIG. 1), a second position (shown in FIG. 2), and a third position (shown in FIG. 3). Shifter assembly 40 may be configured to manually slide in fore and aft direction, or alternatively, electronic and electrical systems may provide for the slidable movement of shifter assembly 40.

Still referring to FIGS. 1 through 3, wherein shifter assembly 40 is slidably coupled to base member 20, shifter assembly is configured conceal and/or expose certain articles 30 depending on its position. FIG. 1 shows shifter assembly 40 in a first position. In the first position, shifter assembly 40 is intermediately positioned along base member 20 so that the storage receptacle (shown as beverage retainers 32) and controls 38 located in front of shifter assembly 40 are accessible to the user, as well as beverage retainers 36 located behind armrest 34.

FIG. 2 shows shifter assembly 40 in a second position. In the second position, shifter assembly 40 is forwardly positioned so that shifter assembly 40 is disposed over and concealing beverage retainers 32 and controls 38. In such a position, controls 39 (located in an area previously covered by shifter assembly 40) are now exposed and accessible to a user.

FIG. 3 shows shifter assembly 40 in a third position. In the third position, shifter assembly 40 is forwardly positioned as well as armrest 34. Such a position may provided for a "cleaner" or more aesthetically pleasing cockpit area by covering articles 30 located in the front of the vehicle and only exposing articles 30 located in a rear portion of the vehicle (e.g., articles 30 likely to be accessible to second and/or third row passengers).

Figure 4:
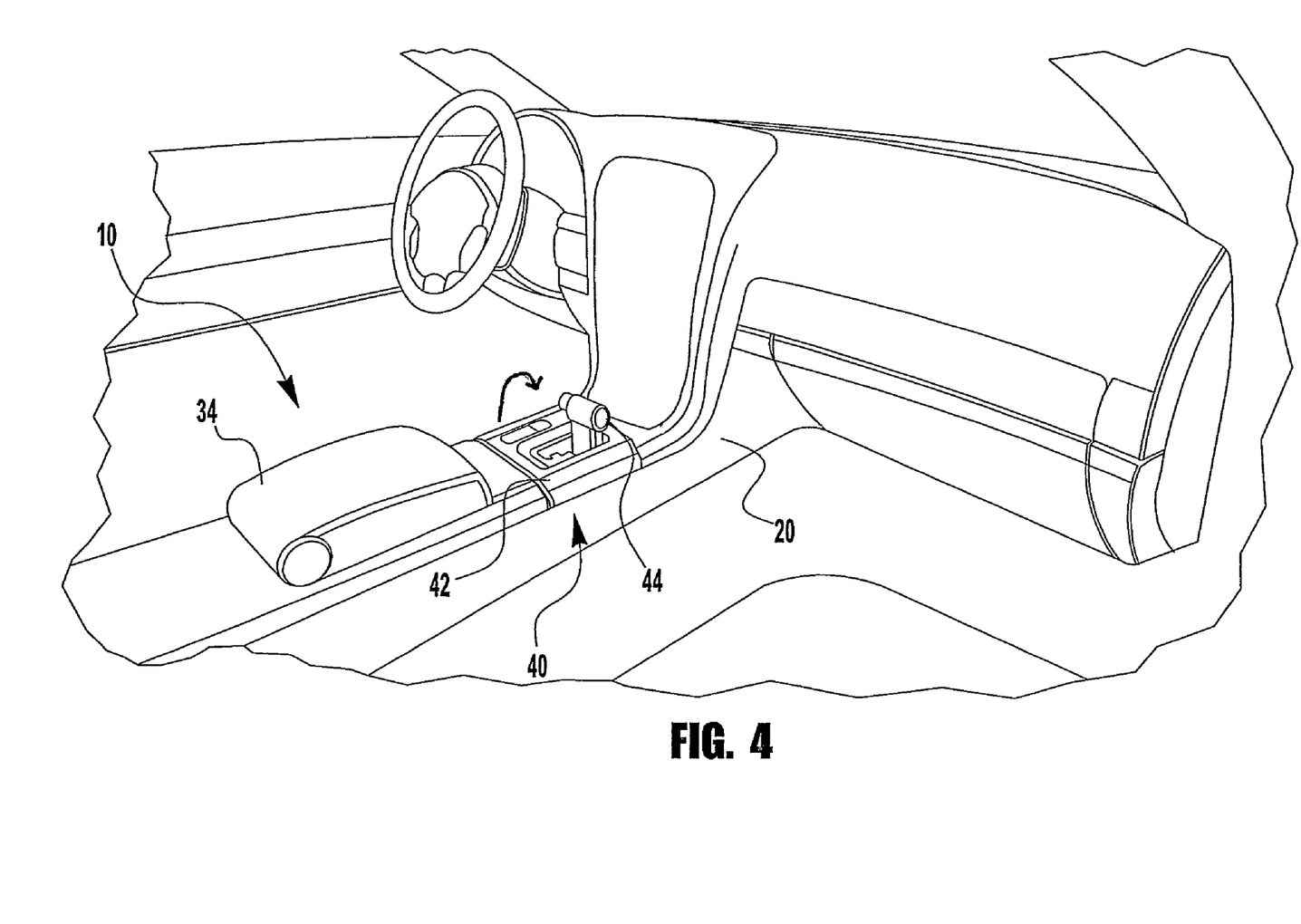
FIG. 4 is a perspective view of a vehicle console system according to another exemplary embodiment, showing the console system in a first position.
Figure 5:
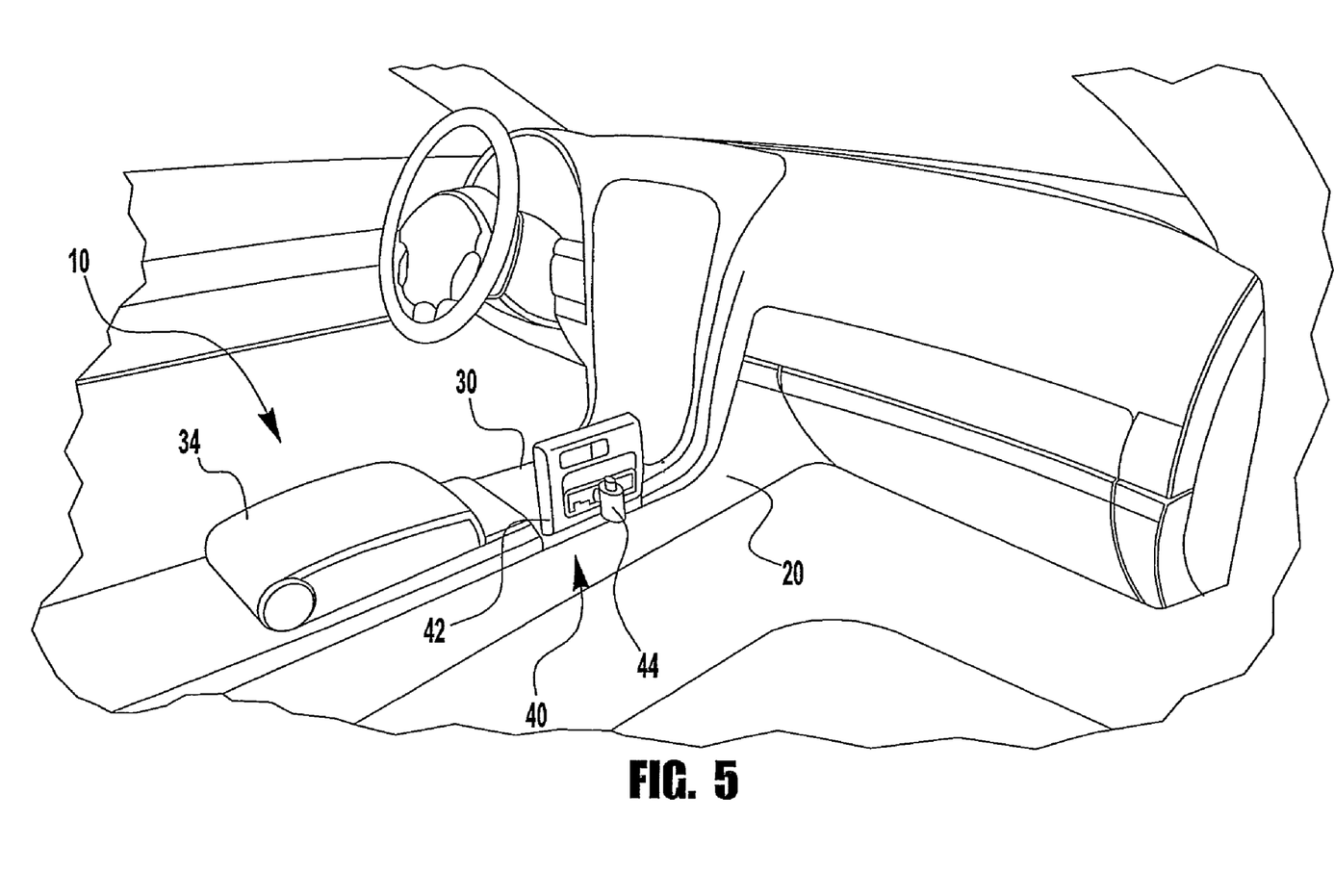
FIG. 5 is a perspective view of the vehicle console system shown in FIG. 4, with the console system moved to a second position.

FIGS. 4 and 5 show console system 10 according to another exemplary embodiment. In such an embodiment, shifter assembly 40 is pivotally coupled to base member 20. Shifter assembly 40 (particularly support member 42) is shown pivotally coupled to base member 20 along a longitudinal edge closest to the passenger seat. Pivotally coupling support member 42 to base member 20 allows an occupant to rotate shifter assembly 40 between a first or closed position (shown in FIG. 4) and a second or open position (shown in FIG. 5). In the closed position, shifter assembly 40 at least one article 30 is concealed and covered by shifter assembly 40. In the open position, shifter assembly 40, is displaced (e.g., moved, pivoted, rotated, etc.) to exposes the at least one articles 30 for providing a user access to the article. According to an exemplary embodiment, pivotally coupling shifter assembly 40 to base member 20 along the longitudinal edge closest to the passenger seat advantageously provides a driver of the vehicle with relatively unobstructed access to articles 30 (such as coin holders, beverage retainers, media storage, etc.) disposed under shifter assembly 40.

Figure 12:
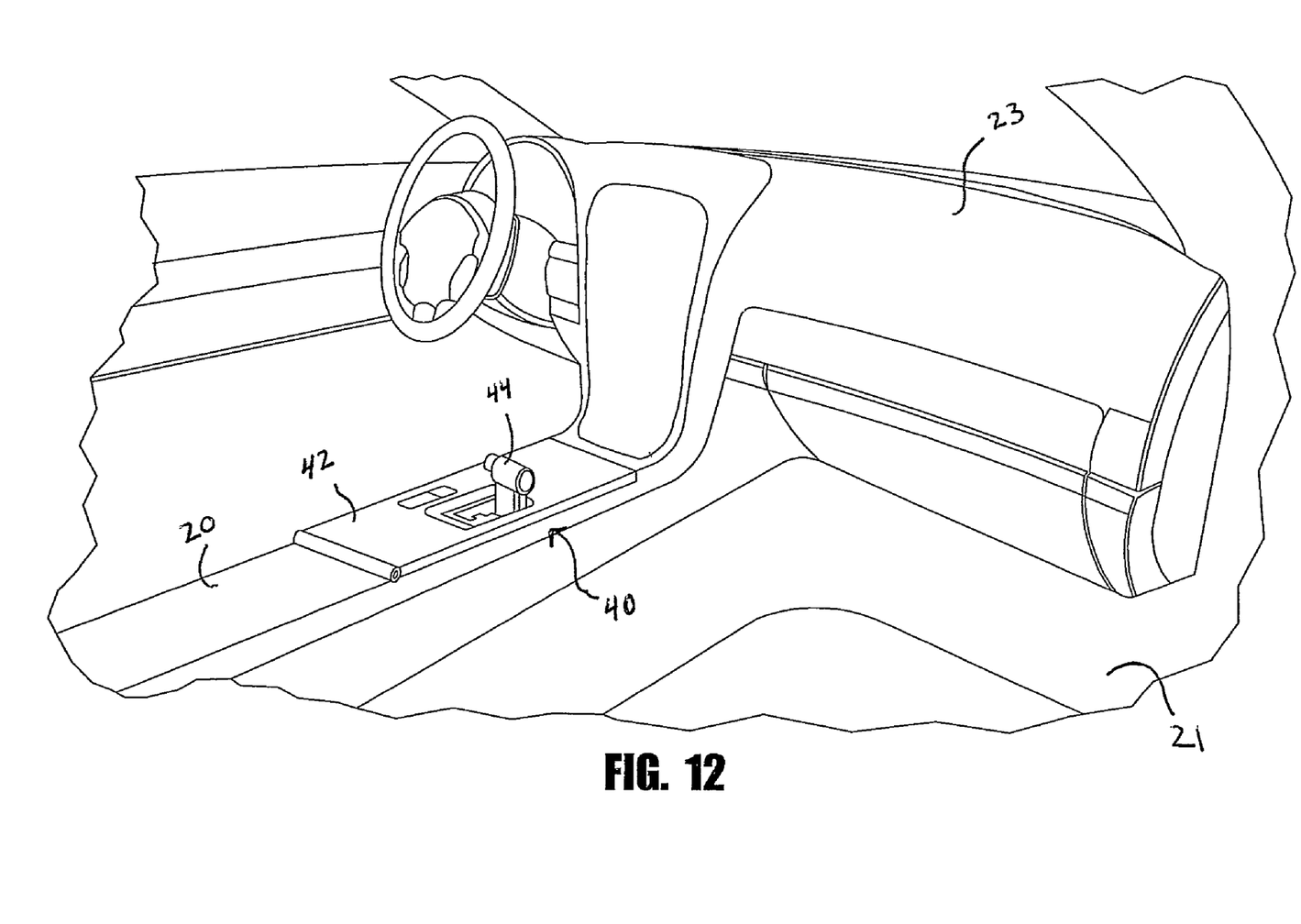
FIG. 12 is a perspective view of a vehicle console system according to another exemplary embodiment, showing the console system in a first position.
Figure 13:
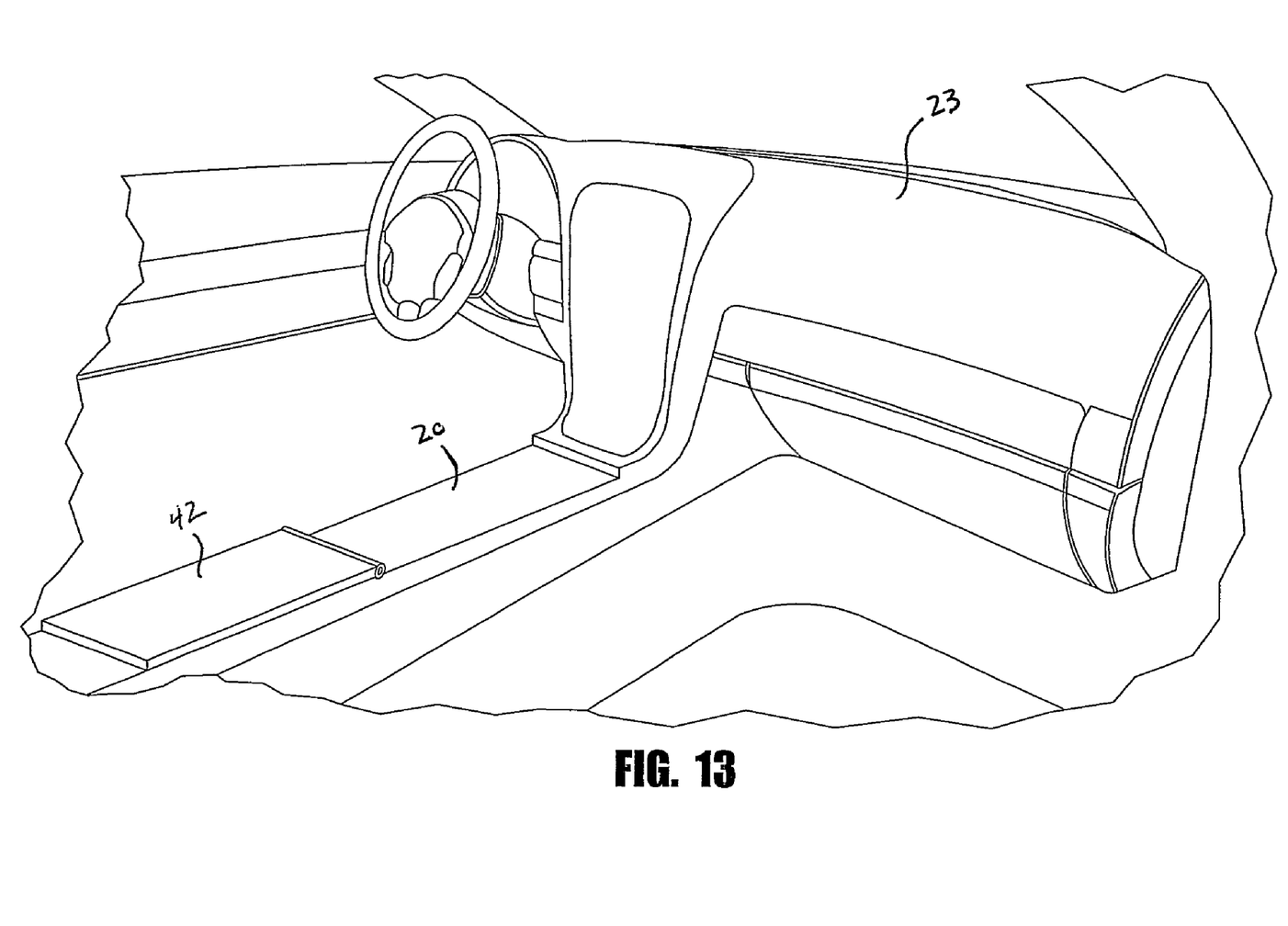
FIG. 13 is a perspective view of the vehicle console system shown in FIG. 12, with the console system in a second position.

According to an alternative embodiment, support member 42 can be pivotally coupled to base member 20 about a single axis causing the shifter assembly 40 to remain in the same horizontal plane when being pivotally moved from an open position to a closed position. As can be appreciated, support member 42 may be pivotally coupled to base member 20 along any edge or point of support member 42. FIGS. 12 and 13 show an alternative embodiment, wherein support member 42 is pivotally coupled to base member 20 along a rear edge.

Figure 6:
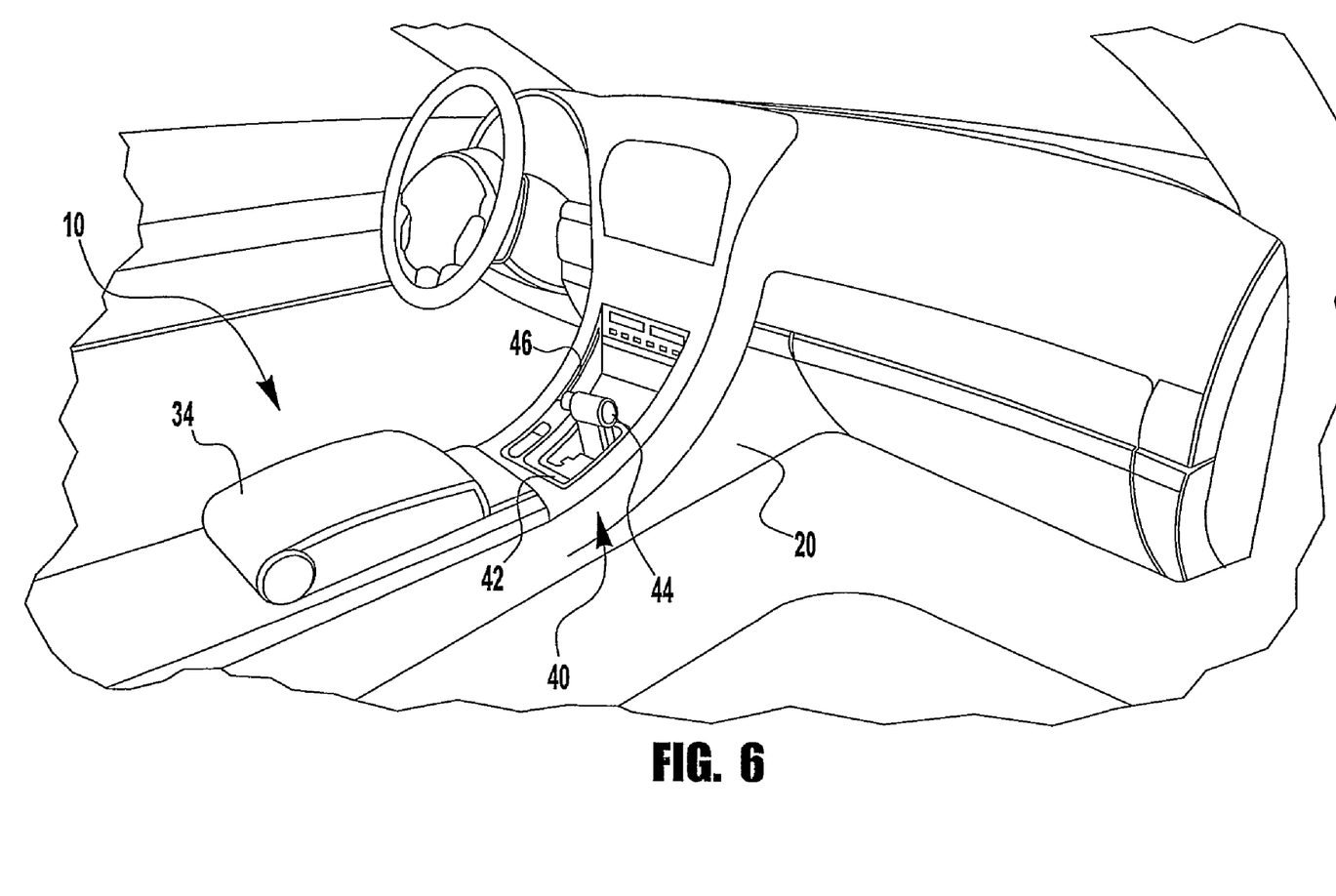
FIG. 6 is a perspective view of a vehicle console system according to another exemplary embodiment, showing the console system in a first position.
Figure 7:
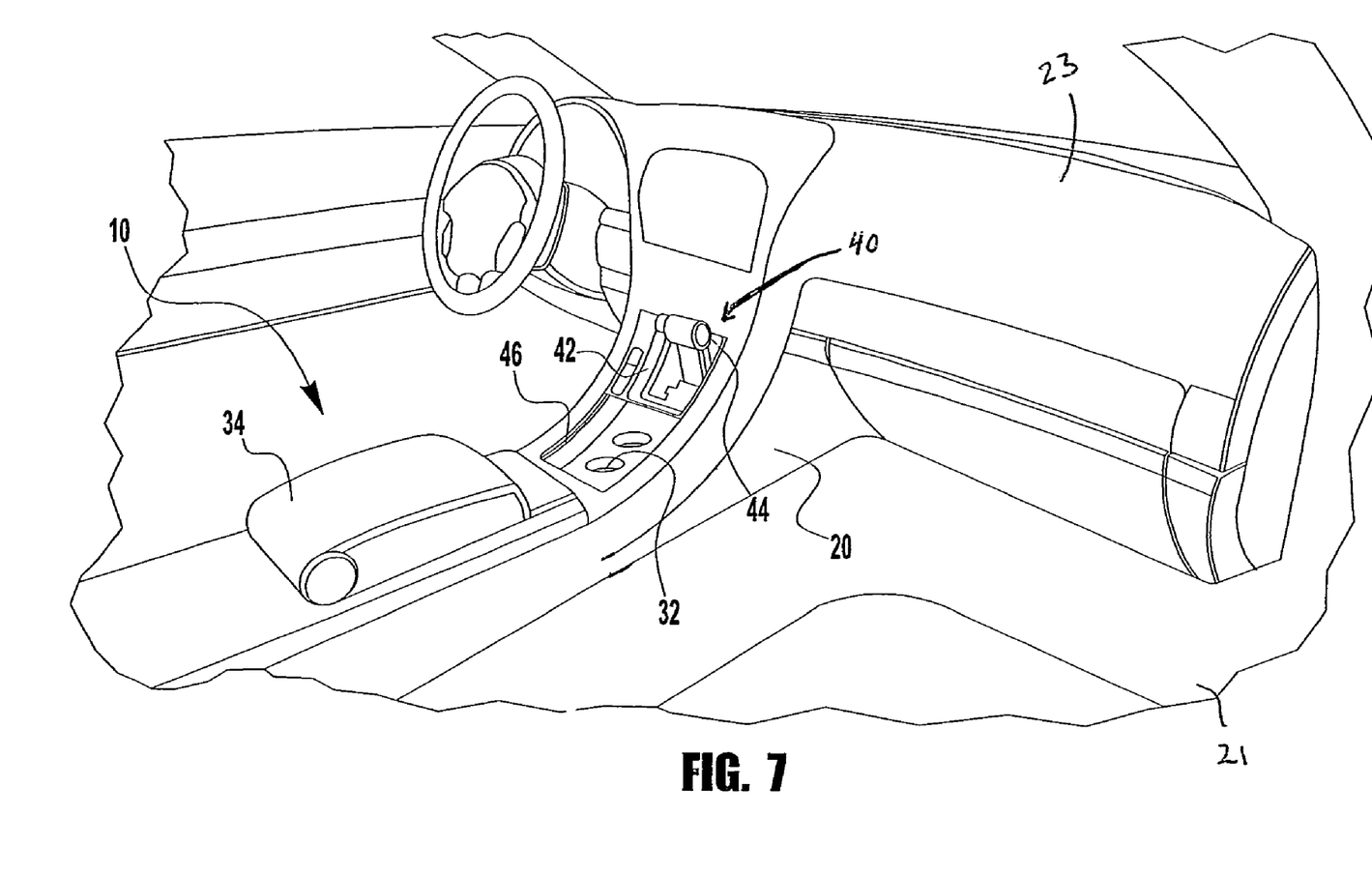
FIG. 7 is a perspective view of the vehicle console system shown in FIG. 6, with the console system moved to a second position.

FIGS. 6 and 7 show console system 10 according to a further exemplary embodiment. Base member 20 is shown as downwardly sloping in a curvilinear manner from instrument panel 23 towards floor 21 before substantially leveling out and extending along the centerline of the vehicle. The curvilinear portion of base member 20 supports a plurality of articles 30, shown particularly as an audio device 31 and a pair of beverage receptacles 32.

Shifter assembly 40 is also supported at the curvilinear portion of base member 20. In such an embodiment, support member 42 has a curvilinear shape corresponding to the curvilinear profile of base member 20. According to a preferred embodiment, support member 42 slidably coupled to base member 20 and adapted for sliding in a reciprocating curvilinear manner between a first position (shown in FIG. 6) and a second position (shown in FIG. 7). In the first position, shifter assembly 40 is disposed over and conceals beverage receptacles 32, while audio device 31 is exposed and accessible to a user. In the second position, shifter assembly 40 is moved forwardly and upwardly until audio device 31 is concealed and beverage receptacles 32 are exposed and accessible to a user. As can be appreciated, any suitable means for providing the slidable movement of support member 42 may be used. For example, as shown in FIGS. 6 and 7, grooves 46 (i.e. slots, channels, recesses, guides, tracks, etc.) are provided in base member 20 to allow for the slidable movement of support member 42.

Figure 8:
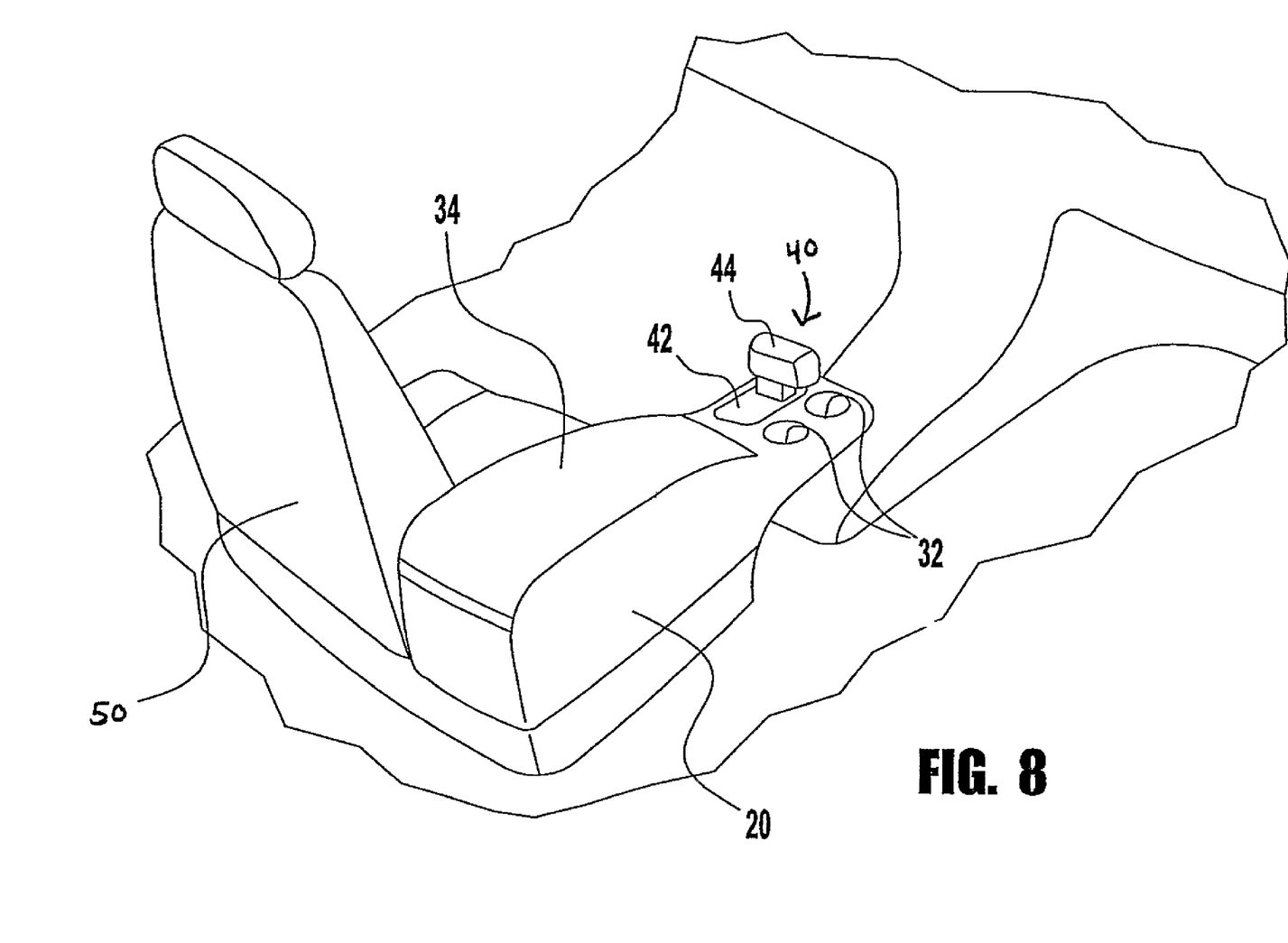
FIG. 8 is a perspective view of a vehicle console system according to another exemplary embodiment.

Referring to FIG. 8, console system 10 is shown according to another exemplary embodiment. Console system 10 is shown configured as a seat-mounted console that includes base member 20, a plurality of articles 30 (shown as an armrest 34 and a pair of beverage receptacles 32), and shifter assembly 40. Base member 20 is shown coupled to a vehicle seat 50 (shown as a driver seat). Base member 20 may be integrally formed vehicle seat 50, or alternatively may be a separate component mounted to vehicle seat 50. According to various alternative embodiments, base member may be coupled to a passenger seat and/or the combination of a driver and a passenger seat.

In such an embodiment, console system 10 moves with vehicle seat 50 and may provide for optimal positioning of articles 30 and shifter assembly 40 regardless of the positioning of vehicle seat 50. Such a seat-mounted console configuration is advantageous since drivers of different sizes are likely to position the driver seat in different positions in the vehicle. Vehicle seat 50 is preferably movable in the fore and aft direction of the vehicle, and may further (or alternatively) be movable in a lateral direction of the vehicle. Fore and aft movement of vehicle seat 50 and console system 10 can accommodate operators of different height, while lateral movement of vehicle seat 50 and console system 10 can allow vehicle seat 50 to be moved to the centerline of the vehicle for a center-drive configuration.

Figure 9:
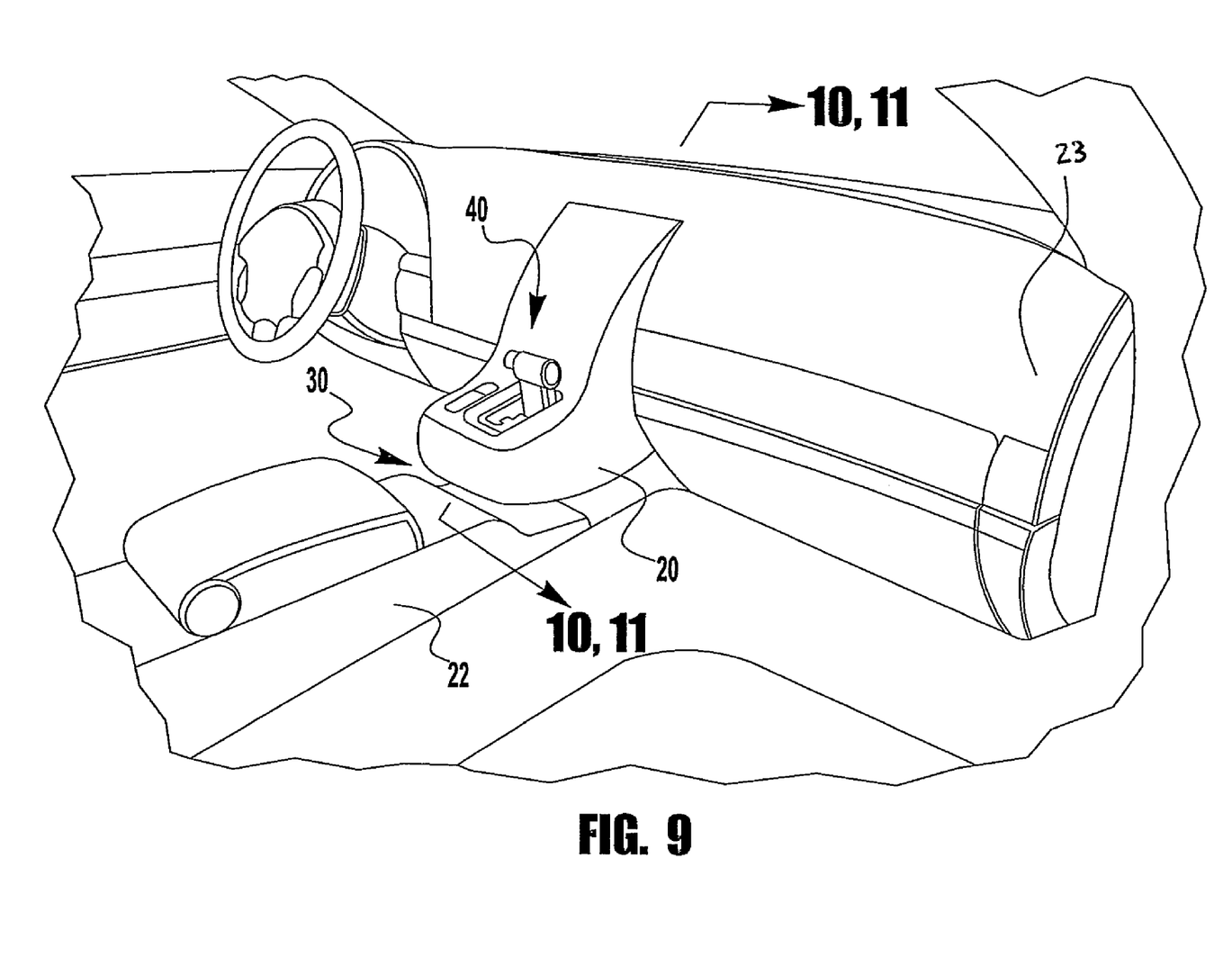
FIG. 9 is a perspective view of a vehicle console system according to another exemplary embodiment, showing the console system in a first position.
Figures 10, 11:
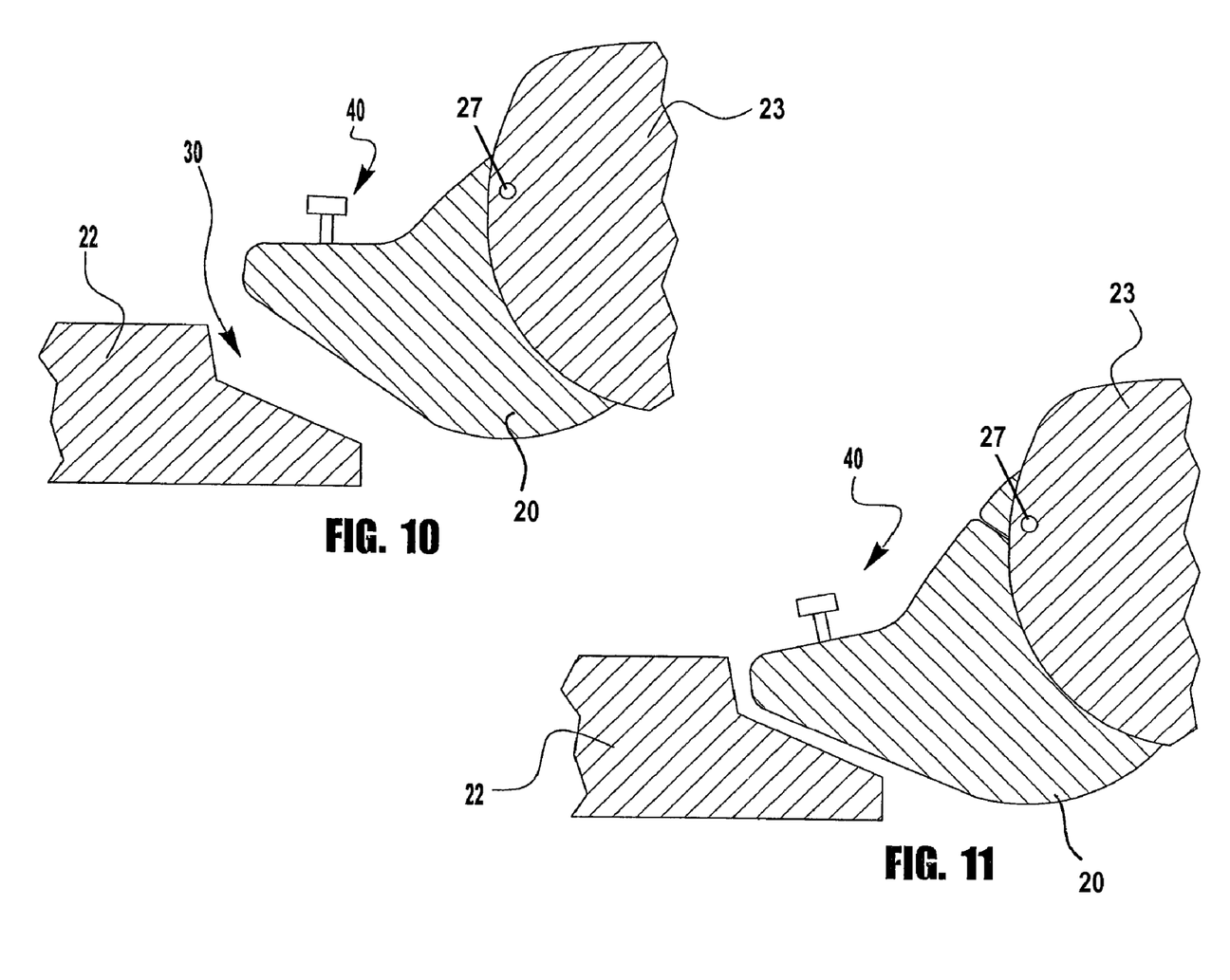
FIG. 10 is a cross-sectional view of the vehicle console system shown in FIG. 9, taken along the line 10-10.
FIG. 11 is a cross-sectional view of the vehicle console system shown in FIG. 10, with the console system in a second position.

Referring to FIGS. 9 through 11, console system 10 is shown according to another exemplary embodiment. Console system 10 is an instrument panel-mounted console and includes base member 20 and shifter assembly 40. According to an exemplary embodiment, base member 20 is movably coupled to instrument panel 23 and shown laterally (i.e. side to side) centered within the vehicle. Referring particularly to FIGS. 10 and 11, base member 20 is pivotally coupled to instrument panel 23 about a pivot shaft 27 and configured to move between a first position (shown in FIG. 10) and a second position (shown in FIG. 11). Base, member 20 is shown adapted for pivoting in an upwardly and downwardly direction, but alternatively, may be adapted for pivoting in a lateral direction.

Console system 10 is shown to include a second base member 22 having a portion that underlies base member 20. Second base member 22 may be configured to support a plurality of articles (not shown), and particularly may be configured to support a variety of articles on the portion of second base member 22 that underlies base member 20. Referring to particularly to FIG. 10, base member 20 may be rotated upward so that a user may gain access to articles positioned on the portion of base member 22 that underlies base member 20. Referring to particularly to FIG. 11, base member 20 may be rotated downward so that the articles are concealed. In addition, base member 20 may be movably coupled to instrument panel 23 so that shifter assembly 40 can optimally placed for the driver.

Figure 14:
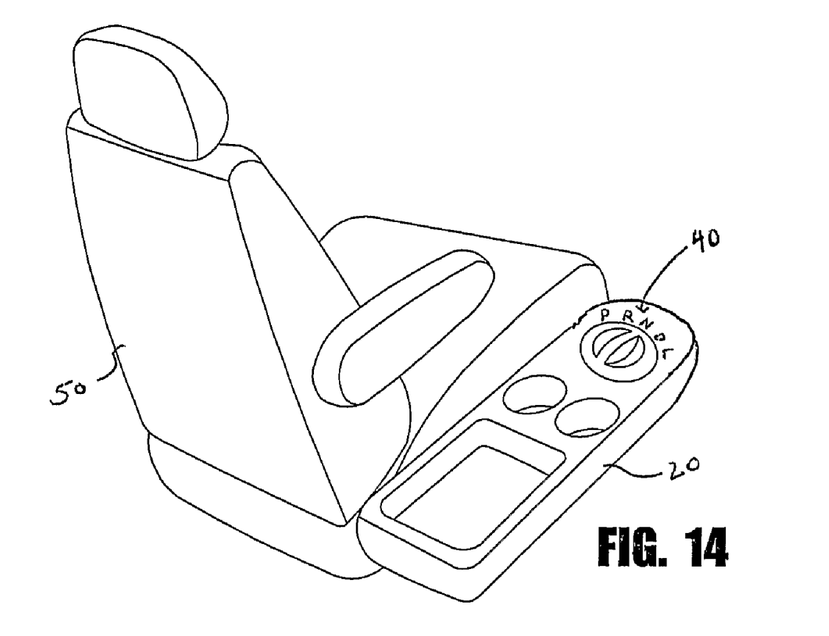
FIG. 14 is a perspective view of a vehicle console system according to another exemplary embodiment, showing the console system in a first position.
Figure 15:
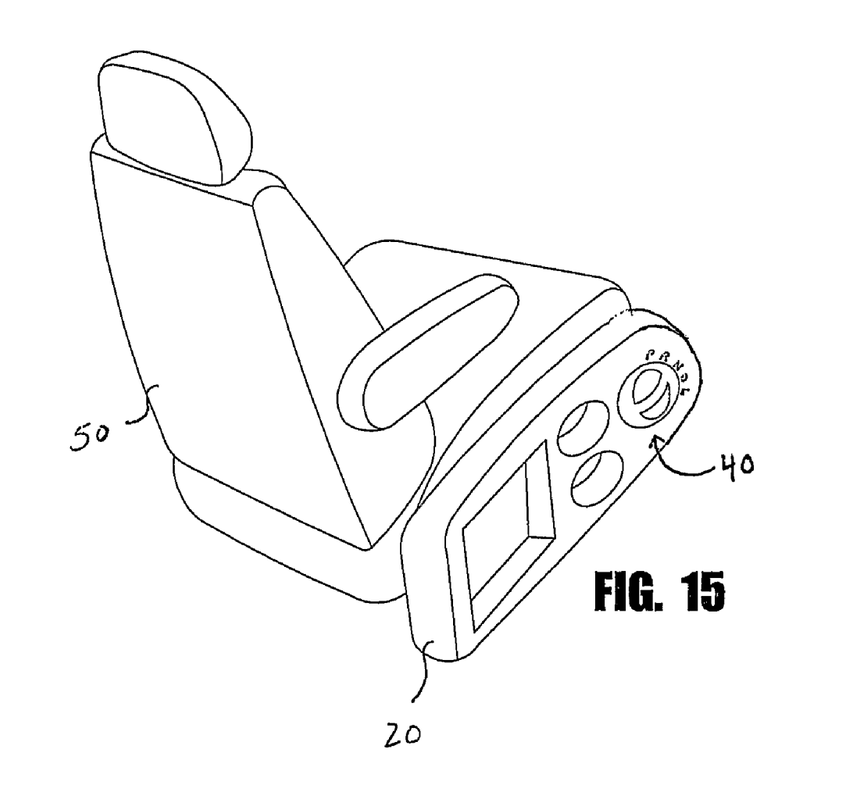
FIG. 15 is a perspective view of the vehicle console system shown in FIG. 14, with the console system in a second position.

It is important to note that the construction and arrangement of the elements of the console provided herein are illustrative only. Although only a few exemplary embodiments of the present invention have been described in detail in this disclosure, those skilled in the art who review this disclosure will readily appreciate that many modifications are possible in these embodiments (such as variations in installation location and orientation within a vehicle, sizes, structures, shapes and proportions of the various elements, mounting arrangements, use of materials, combinations of shapes, etc.) without materially departing from the novel teachings and advantages of the invention. For example, the term console is not intended to be limited to consoles mounted on the floor of a vehicle or to a seating system of a vehicle. Consoles may be mounted to a variety of vehicle structures including, but not limited to, side panels, doors, instrument panels (i.e. dashboards), and overhead structure. In addition, the present invention is not limited to consoles having transmission controls coupled to them, but is intended to include any control system or module for a variety of vehicle systems that may be coupled to a console that conventionally requires a mechanical linkage that would prevent the console from being movable or selectively reconfigurable. For example, it is commonly known to couple the controls of a parking brake, HVAC, or the like to a vehicle console. The scope of the present invention encompasses a console system having a by-wire controlled parking brake assembly, HVAC, or the like coupled to the console. Other controls, such as acceleration controls and engagement controls (e.g. controls for engaging a snow plow, a bucket of a tracker, a rotating blade on farm equipment, etc.) may also be coupled to the console of the present invention. Further, it may be desirable to provide a latching or locking mechanism suitable for securing base member 20 and/or shifter assembly 40 in a selected position. Such a locking mechanism may enhance vehicle security by allowing a user to selectively lock the base member and/or shifter assembly in a position that conceals valuable components or the shifter assembly itself. Further, the scope of the present invention includes console configurations as shown in FIGS. 14 and 15, wherein the console may be folded or selectively positioned so that a pass through area for a user or an object is created. According to the embodiment shown, console 20 is movably coupled to vehicle seat 50 and configured to move between a use position (shown in FIG. 14) and a collapsed or stowed position (shown in FIG. 15).

While the present invention has been described in connection with a particularly preferred embodiment thereof, the invention is not to be limited by the drawings. The order or sequence of any process or method steps may be varied or re-sequenced according to alternative embodiments. Any functional elements are intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A console for use in a vehicle, the console comprising:
a base coupled to the vehicle;
a vehicle transmission control module movably coupled to the base; and
a storage receptacle supported at the base,
wherein the vehicle transmission control module is configured to move between a first position wherein the storage receptacle is at least partially concealed by the vehicle transmission control module and a second position wherein the storage receptacle is accessible to a user, and wherein the vehicle transmission control module is configured to be usable by the user in both the first position and the second position to control a vehicle transmission.

2. The console of claim 1, wherein the vehicle transmission control module is configured to be electrically coupled to the vehicle transmission for controlling the vehicle transmission with an electrical signal.

3. The console of claim 2, wherein the vehicle transmission control module is configured to control the vehicle transmission without a mechanical linkage.

4. The console of claim 1, wherein the vehicle transmission control module comprises:
a support structure movably coupled to the base; and
a user interface supported by the support structure and configured to allow a user to control the gear selection of the vehicle transmission.

5. The console of claim 1, wherein the vehicle transmission control module is slidably coupled to the base and adapted for translational movement in a fore and aft direction of the vehicle between the first position and the second position.

6. The console of claim 5, wherein the vehicle transmission control module is configured to slide in a curvilinear manner between the first position and the second position.

7. A console for use in a vehicle, the console comprising:
a base movably coupled to the vehicle;
a vehicle transmission control module movably coupled to the base; and
a storage receptacle supported at the base,
wherein the vehicle transmission control module is configured to move between a first position wherein the storage receptacle is at least partially concealed by the vehicle transmission control module and a second position wherein the storage receptacle is accessible to a user.

8. The console of claim 7, wherein the vehicle transmission control module is rotatably coupled the base and adapted for rotating between the first position and the second position.

9. The console of claim 8, further comprising a hinge for pivotally coupling the vehicle transmission control module to the base, and positioned to allow the vehicle transmission control module to be rotated away from the user.

10. The console of claim 7, wherein the base is coupled to a vehicle seat that is movably coupled to the vehicle.

11. The console of claim 10, wherein the base is movably coupled to the vehicle seat and configured to move between a use position and a stowed position to provide for a pass-through area in the vehicle.

12. The console of claim 9, wherein the base is movably coupled to an instrument panel located in a front portion of the vehicle.

13. The console of claim 12, wherein the base is pivotally coupled to the instrument panel.

14. The console of claim 13, wherein the base is configured to pivot in an upwardly and downwardly direction relative to the instrument panel.

15. The console of claim 9, wherein the vehicle transmission control module is configured to be electrically coupled to a vehicle transmission for controlling the vehicle transmission with an electrical signal.

16. The console of claim 9, wherein the vehicle transmission control module is configured to control a vehicle transmission without a mechanical linkage.

* * * * *

UNITED STATES PATENT AND TRADEMARK OFFICE
CERTIFICATE OF CORRECTION

PATENT NO. : 7,661,505 B2 Page 1 of 1
APPLICATION NO. : 10/582065
DATED : February 16, 2010
INVENTOR(S) : Spykerman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Thirtieth Day of November, 2010

David J. Kappos
*Director of the United States Patent and Trademark Office*